(12) United States Patent
Tremper, III et al.

(10) Patent No.: US 7,867,617 B2
(45) Date of Patent: Jan. 11, 2011

(54) LOW TEMPERATURE CURABLE MELAMINE CONTAINING COATING COMPOSITION AND THE USE THEREOF

(75) Inventors: Henry Stever Tremper, III, Clayton, NJ (US); Valentina Gordin, Princeton, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 674 days.

(21) Appl. No.: 11/903,985

(22) Filed: Sep. 25, 2007

(65) Prior Publication Data

US 2009/0042039 A1   Feb. 12, 2009

Related U.S. Application Data

(60) Provisional application No. 60/848,196, filed on Sep. 29, 2006.

(51) Int. Cl.
B32B 27/40 (2006.01)
C08K 5/3492 (2006.01)
C08G 63/06 (2006.01)

(52) U.S. Cl. .................. 428/423.1; 524/100; 524/450
(58) Field of Classification Search ............. 428/423.1; 524/100, 450
See application file for complete search history.

(56) References Cited

U.S. PATENT DOCUMENTS

| 5,326,820 | A | 7/1994 | Hoffmann et al. | |
| 6,413,588 | B1 * | 7/2002 | Pettus et al. | 427/327 |
| 6,592,944 | B1 | 7/2003 | Uhlianuk et al. | |
| 6,894,124 | B2 * | 5/2005 | Matsuno et al. | 525/509 |
| 2004/0043152 | A1 | 3/2004 | Barsotti et al. | |
| 2005/0249954 | A1 * | 11/2005 | Kawaguchi et al. | 428/414 |
| 2006/0042724 | A1 | 3/2006 | Adams | |

FOREIGN PATENT DOCUMENTS

JP   53-102332   9/1978

OTHER PUBLICATIONS

PCT International Search Report and Written Opinion for International Application No. PCT/US2007/020947 dated Jan. 31, 2008.

\* cited by examiner

*Primary Examiner*—Thao T. Tran
(74) *Attorney, Agent, or Firm*—Gann G Xu

(57) ABSTRACT

The present invention is directed to a melamine containing coating composition curable at ambient temperatures and suitable for coating plastic substrates. The present invention is also directed to a process for coating plastic substrates with a melamine containing coating composition curable at ambient temperatures.

5 Claims, No Drawings

LOW TEMPERATURE CURABLE MELAMINE CONTAINING COATING COMPOSITION AND THE USE THEREOF

CROSS-REFERENCE TO RELATED APPLICATION

This application claims priority under 35 U.S.C. §119 from U.S. Provisional Application Ser. No. 60/848,196 (filed Sep. 29, 2006), the disclosure of which is incorporated by reference herein for all purposes as if fully set forth.

FIELD OF INVENTION

The present invention is directed to a coating composition curable at ambient temperatures and suitable for coating plastic substrates. The present invention is also directed to a process for coating plastic substrates with a coating composition curable at ambient temperatures.

BACKGROUND OF INVENTION

Resinous materials, such as thermoplastic olefins (TPO), sheet molding compounds (SMC), engineering polymers, such as Noryl GTX®, polyamide (PA) reinforced with a modified polyphenylene ether polymer (PPE) supplied by GE Company, and reaction injection molded (RIM) polyurethane are used in many applications, such as automobile parts and accessories, containers, household appliances and other commercial items. It is often desirable to coat articles made from such resinous materials with coatings that are esthetically pleasing. Such coatings are also used to protect such articles from degradation when exposed to atmospheric weathering conditions, such as sunlight, moisture, heat and cold. To produce longer lasting and more durable articles from resinous materials, it is necessary for the coatings to tightly adhere to the surface of such articles.

Resinous substrates made from a variety of thermoplastic and thermosetting resinous materials have widely varying surface properties, including surface tension, roughness, flexibility, and have widely varying bulk properties such as solubility parameter, which make it difficult to achieve adequate adhesion of the coatings to such materials, particularly upon aging or environmental exposure of the resinous materials. It is well known to apply an adhesion promoter or tie coat on a resinous substrate surface to improve adherence of the coating to the surface. The application of an adhesion promoter or tie coat is normally an added step in the coating process. The adhesion promoter is usually applied in a thin layer, normally about 6.35 micrometers (0.25 mils). Additionally, flame or corona pretreatment steps can be also used to facilitate adequate adhesion of organic coatings to some resinous substrates.

The use of adhesion promoters and/or corona pretreatments in a coating system used to coat resinous substrates, adds complexity and cost to the system. The application of an adhesion promoter usually entails coating the resinous substrate with the promoter, followed by some drying or curing time which increases the time of the entire coating process and will usually necessitate additional workspace. Accordingly, coating compositions which exhibit excellent adhesion directly to resinous materials, such as TPO and Noryl GTX® polyamide without the use of adhesion promoters or tie coats are desirable.

STATEMENT OF INVENTION

This invention is directed to A coating composition curable at ambient temperatures, said coating composition comprising:
(A) a crosslinkable component comprising 15 to 99 weight percent of total solid weight of the crosslinkable component a polyester having hydroxyl crosslinkable groups, and 1 to 15 weight percent of total solid weight of the crosslinkable component a melamine having crosslinkable groups selected from an —NH group, a hydroxyl group, or a combination thereof; and
(B) a crosslinking component comprising a polyisocyanate compound having two or more isocyanate groups that react with the crosslinkable groups.

This invention is also directed to a process for producing a coating on a substrate, said process comprising the steps of:
(A) mixing components of a coating composition to form a pot mix, wherein said coating composition comprises:
   i) a crosslinkable component comprising 15 to 99 weight percent of total solid weight of the crosslinkable component a polyester having hydroxyl crosslinkable groups, and 1 to 35 weight percent of total solid weight of the crosslinkable component a melamine having crosslinkable groups selected from an —NH group, a hydroxyl group, or a combination thereof; and
   ii) a crosslinking component comprising a polyisocyanate compound having two or more isocyanate groups that react with the crosslinkable groups;
(B) applying the pot mix over the substrate to form a layer; and
(C) curing the layer on the substrate to form said coating.

DETAILED DESCRIPTION OF PREFERRED EMBODIMENT

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Two-pack coating composition" means a thermoset coating composition comprising two components that are stored in separate containers, which are typically sealed for increasing the shelf life of the components of the coating composition. The components are mixed just prior to use to form a pot mix, which has a limited pot life, typically few minutes, such as 15 minutes to 45 minutes to few hours, such as 4 hours to 10 hours. The pot mix is applied as a layer of desired thickness on a substrate surface, such as an aircraft frame. After application, the layer dries and cures to form a coating on the substrate surface having desired coating properties, such as, high gloss, mar-resistance, resistance to environmental etching and resistance to degradation by solvent. A typical two-pack coating composition comprises a crosslinkable component and a crosslinking component.

"Low VOC coating composition" means a coating composition that includes less than 0.6 kilograms of organic solvent (volatile organic component) per liter (5 pounds per gallon), preferably less than 0.53 kilograms (4.4 pounds per gallon) of the composition. VOC level is determined under the procedure provided in ASTM D3960.

"High solids composition" means a coating composition having solid component of above 40 percent, preferably in the range of from 45 to 85 percent and more preferably in the range of from 50 to 65 percent, all in weight percentages based on the total weight of the composition.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofuran and the standard was polymethyl methacrylate.

"Tg" means glass transition temperature.

"Polymer solids" or "Binder solids" means a polymer or binder in its dry state.

The present invention is directed to a two-pack low VOC ambient curable coating composition that is particularly suited for use in coating on plastic substrates. The composition includes a binder that has a crosslinkable component and a crosslinking component in an organic solvent. The amount of organic solvent used results in the composition having VOC of less than 0.6 kilograms (5 pounds per gallon) and preferably in the range of 0.25 kilograms to 0.53 kilograms (2.1 pounds to 4.4 pounds per gallon) of organic solvent per liter of the composition.

"Crosslinkable component" includes a compound, oligomer, polymer or copolymer having functional crosslinkable groups positioned in each molecule of the compound, oligomer, the backbone of the polymer, pendant from the backbone of the polymer, terminally positioned on the backbone of the polymer, or a combination thereof. One of ordinary skill in the art would recognize that certain crosslinkable group combinations would be excluded from the crosslinkable component of the present invention, since, if present, these combinations would crosslink among themselves (self-crosslink), thereby destroying their ability to crosslink with the crosslinking groups in the crosslinking components defined below.

Typical crosslinkable component can have on an average 2 to 25, preferably 2 to 15, more preferably 2 to 5, even more preferably 2 to 3, crosslinkable groups selected from hydroxyl, acetoacetoxy, carboxyl, primary amine, secondary amine, epoxy, anhydride, imino, ketimine, aldimine, or a combination thereof. The hydroxyl and imino functional groups are preferred functional crosslinkable groups of this invention.

The crosslinkable component of the present invention may include a polyester, a melamine, or a combination thereof.

Polyesters having hydroxyl crosslinkable functional groups are suitable for this invention. The polyester has a GPC weight average molecular weight exceeding 1500, preferably in the range of from 1500 to 100,000, more preferably in the range of 2000 to 50,000, still more preferably in the range of 2000 to 8000 and most preferably in the range of from 2000 to 5000. The Tg of the polyester varies in the range of from −50° C. to +100° C., preferably in the range of from −20° C. to +50° C.

The polyester suitable for use in the present invention may be any conventional solvent soluble polyester conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One of the commercially available polyester, which is particularly preferred, is SCD®-1040 polyester, which is supplied by Etna Product Inc., Chagrin Falls, Ohio.

The crosslinkable component may further comprise acrylic polymers, reactive oligomers, or a combination thereof, as well known in the coating industry.

The crosslinking component is stored separately from the crosslinkable component prior to application. "Crosslinking component" is a component that includes a compound, oligomer, polymer or copolymer having crosslinking functional groups positioned in each molecule of the compound, oligomer, the backbone of the polymer, pendant from the backbone of the polymer, terminally positioned on the backbone of the polymer, or a combination thereof, wherein these functional groups are capable of crosslinking with the crosslinkable functional groups on the crosslinkable component (during the curing step) to produce a coating in the form of crosslinked structures. One of ordinary skill in the art would recognize that certain crosslinking group/crosslinkable group combinations would be excluded from the present invention, since they would fail to crosslink and produce the film forming crosslinked structures.

Typical crosslinking component can be selected from a compound, oligomer, polymer or copolymer having crosslinking functional groups selected from the group consisting of isocyanate, amine, ketimine, melamine, epoxy, polyacid, anhydride, and a combination thereof. It would be clear to one of ordinary skill in the art that generally certain crosslinking groups from crosslinking components crosslink with certain crosslinkable groups from the crosslinkable components. Some of those paired combinations include: (1) ketimine crosslinking groups generally crosslink with acetoacetoxy, epoxy, or anhydride crosslinkable groups; (2) isocyanate and melamine crosslinking groups generally crosslink with hydroxyl, primary and secondary amine, ketimine, or aldimine crosslinkable groups; (3) epoxy crosslinking groups generally crosslink with carboxyl, primary and secondary amine, ketimine, or anhydride crosslinkable groups; (4) amine crosslinking groups generally crosslink with acetoacetoxy crosslinkable groups; (5) polyacid crosslinking groups generally crosslink with epoxy crosslinkable groups; and (6) anhydride crosslinking groups generally crosslink with epoxy and ketimine crosslinkable groups.

Isocyanate crosslinking groups are preferred crosslinking groups of this invention.

The crosslinking groups and the crosslinkable groups can be provided so that the ratio of equivalents of isocyanate group (—NCO) per equivalent of the crosslinkable group, hydroxyl or imino groups or a combination thereof, herein referred to as "NCO/(OH—NH) ratio", is in the range of from 0.5/1 to 3.0/1, preferably in the range of from 1.1/1 to 3/1, more preferably in the range of from 1.1/1 to 2.5/1.

Some of suitable isocyanates include aliphatic, or cycloaliphatic isocyanates, trifunctional isocyanates and isocyanate functional adducts of a polyol and difunctional isocyanates. Some of the particular isocyanates include diisocyanates such as 1,6-hexamethylene diisocyanate, isophorone diisocyanate, biscyclohexyl diisocyanate, ethyl ethylene diisocyanate, 1-methyltrimethylene diisocyanate, and bis-(4-isocyanatocyclohexyl)-methane. For a non-primer layer(s), such as topcoats, non-aromatic isocyanates as described above are preferred. For use in primer layers of a coating, aromatic isocyanates, such as 4,4'-biphenylene diisocyanate, toluene diisocyanate, tetramethylene xylene diisocyanate, 1,3-phenylene diisocyanate, 1,5-napthalene diisocyanate, and 4,4'-diisocyanatodiphenyl ether, may also be used.

Some of the suitable trifunctional isocyanates include triphenylmethane triisocyanate, 1,3,5-benzene triisocyanate, and 2,4,6-toluene triisocyanate. Trimers of diisocyanate, such as the trimer of hexamethylene diisocyante sold under the trademark Desmodur®N-3390 by Bayer Corporation of Pittsburgh, Pa. and the trimer of isophorone diisocyanate are also suitable. Furthermore, trifunctional adducts of triols and diisocyanates are also suitable. Trimers of diisocyanates are preferred and trimers of isophorone and hexamethylene diisocyantes are more preferred. Low viscosity trimers of diisocyanate, such as the one sold under the trademark Desmodur® XP 2410 by Bayer Corporation of Pittsburgh, Pa. are further more preferred. Viscosity of the trimers of diiscyanate is preferably below 1500 mPa·s, more preferably below 1000 mPa·s, and further more preferably at or below 700 mPa·s. Viscosity measurement is based on ASTM test D2196.

Melamine-formaldehyde resins ("Melamines") are well known crosslinking agents for coatings. They can react with hydroxyl functional polymers at elevated temperatures, such as above 1800 (82° C.), to form crosslinked coatings. Melamines are commonly used as crosslinking agents in original equipment manufacturing (OEM) coatings for automotive vehicles and light trucks. These OEM coatings are normally baked at high temperatures, preferably 265° F. (130° C.) or above. At ambient temperatures, the reaction between hydroxyl groups and melamine functional groups is extremely slow. As mentioned above, isocyanates can also react with amine groups to form crosslinks. Some melamines have amino, more properly imino, functional groups. The imino group on melamines is generally known to react rapidly with isocyanates. Melamines that are fully formulated, so-called fully alkylated melamines, no longer have a significant number of active hydrogens on the imino nitrogens and are not reactive with isocyanates. In addition to being a crosslinking agent, melamine is also known to promote adhesion in adhesives. Due to the requirement for curing at high temperatures, melamine is generally not used in coatings that require curing at ambient temperatures.

Inventors of this invention unexpectedly discovered that when specific melamines are added to a hydroxyl/isocyanate containing coating composition, the resulting coating has improved adhesion to plastic substrates yet still has normal pot life. Suitable melamine must have at least one intact hydrogen in the imino group of the melamine, hereafter referred to as the —NH group, a hydroxyl group, or a combination thereof, wherein the —NH group or the hydroxyl group may react with the isocyanate group to form crosslinks. The coating is preferably cured at ambient temperature, which is the temperature of the environment that a coating is exposed to without heating or cooling, and can be in a range of from 40° F. (4° C.) to 200° F. (93° C.), preferably in a range of from 50° F. (10° C.) to 150° F. (66° C.), and further preferably, in a range of from 65° F. (18° C.) to 122° F. (50° C.).

Some of the suitable melamines having at least one —NH or a hydroxyl group include monomeric melamine, polymeric melamine-formaldehyde resin or a combination thereof. The monomeric melamines include low molecular weight melamines which contain, on an average, three or more methylol groups etherized with a C1 to C5 monohydric alcohol such as methanol, n-butanol, or isobutanol per triazine nucleus. Some such suitable monomeric melamines include alkylated melamines, such as methylated, butylated, isobutylated melamines and mixtures thereof. Many of these suitable monomeric melamines are supplied commercially. For example, Cymel® 373, Cymel® 370, Cymel® 380, Cymel® 325, or Cymel®1158 from Cytec Industries Inc., West Patterson, N.J. are all suitable melamines. Suitable polymeric melamine-formaldehyde resins include high imino (partially formulated, —NH) melamine known as Resimene® 872, which is supplied by INEOS Melamines GmbH, Frankfurt, Germany.

The crosslinkable component of this invention may have 1 to 99 weight percent of total solid weight of the crosslinkable component a polyester having hydroxyl crosslinkable groups and 1 to 35 weight percent of total solid weight of the crosslinkable component a melamine having crosslinkable groups selected from an —NH group, a hydroxyl group, or a combination thereof.

The crosslinkable component may include a catalytic amount of a catalyst for accelerating the curing process. The catalytic amount depends upon the reactivity of the primary hydroxyl group of the reactive oligomer present in the hydroxyl component of the binder. Generally, in the range of from about 0.001 percent to about 5 percent, preferably in the range of from 0.01 percent to 2 percent, more preferably in the range of from 0.02 percent to 1 percent, all in weight percent based on the total weight of the crosslinkable component solids, of the catalyst is utilized. A wide variety of catalysts can be used, such as, tin compounds, including dibutyl tin dilaurate; tertiary amines, such as, triethylenediamine. These catalysts can be used alone or in conjunction with carboxylic acids, such as, acetic acid. One of the commercially available catalyst sold under the trademark, Fascat® 4200 dibutyl tin dilaurate by Arkema, Bristol, Pa., is particularly suitable.

The crosslinking component of the coating composition of the present invention, which is formulated into high solids coating systems further contains at least one organic solvent which is typically selected from the group consisting of aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to the crosslinking component or the crosslinkable component or both of the coating composition.

The coating composition of the present invention may also contain conventional, well known in the art, additives, such as pigments, stabilizers, rheology control agents, flow agents, toughening agents, UV protection agents, moisture scavenger and fillers. Such additional additives will, of course, depend on the intended use of the coating composition. Fillers, pigments, and other additives that would adversely effect the clarity of the cured coating will not be included if the composition is intended as a clear coating. Conductive pigments, such as carbon black pigments, conductive graphite, metal particles, or conductive polymers, can also be added to the coating composition. The foregoing additives may be added to either the crosslinkable or crosslinking components, or both, depending upon the intended use of the coating composition. These additives are preferably added to the crosslinkable component.

The coating composition of the present invention may also contain hindered amine. Typical hindered amine light stabilizers are bis(2,2,6,6-tetramethylpiperidinyl)sebacate, bis(N-methyl-2,2,6,6-tetramethylpiperidinyl)sebacate and bis(N-octyloxy-2,2,6,6-tetramethylpiperidynyl)sebacate. Particularly useful blend of ultraviolet light absorbers and hindered amine light stabilizers is bis(N-octyloxy-2,2,6,6-tetramethylpiperidynyl)sebacate and benzenepropanoic acid, 3-(2H-benzotriazol-2-yl)-5(1,1-dimethylethyl)4hydroxy-, C7-9-branched alkyl esters.

The crosslinkable and the crosslinking components are mixed just prior to use or about 5 to 30 minutes before use to form a pot mix, which has limited pot life. A layer of the pot mix is typically applied to a substrate by conventional techniques, such as, spraying, electrostatic spraying, roller coating, dipping or brushing. The layer of the coating composition then cures at temperatures in a range of from 40° F. (4° C.) to 200° F. (93° C.), preferably in a range of from 50° F. (10° C.) to 150° F. (66° C.), and further preferably, in a range of from 65° F. (18° C.) to 122° F. (50° C.), in the range of 30 minutes to 24 hours to form a coating on the substrate having the desired coating properties. It is understood that the actual curing time depends upon the thickness of the applied layer and on any additional mechanical aids, such as, fans that assist in continuously flowing air over the coated substrate to accelerate the cure rate.

The coating composition of the present invention can be applied to metal or non-metallic substrates. One example of non-metal substrate include plastics or composite plastics including SMC, GTX, nylon, melamine and/or acrylic composites, TPO, TPV, polypropylene, PVC, Styrofoam, polycyclopentadiene and the like. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

The coating compositions of this invention are particularly useful as a primer composition for forming a primer layer that is to be coated with one or more other coating layers such as a basecoat layer and a subsequent topcoat layer. The coating compositions of this invention are also useful as a color matched stand-alone coating layer. It is well known to those skilled in the art to formulate the coating composition to match a desired color using colorants including various pigments, dyes, or a combination thereof. It is also well known to those skilled in the art to formulate the coating composition to match a desired coating appearance such as sparkling or flopping by using effect pigments such as flakes or metallic flakes. One example of such effect pigments is aluminum flake.

The coating composition of this invention can be used as a primer for OEM automotive vehicle coatings or Refinish vehicle coatings. It can also be used to coat devices or appliances having plastic or non-plastic parts thereof, such as, but not limited to, digital devices, such as cell phones, handheld calculators, personal digital assistants (PDAs), desktop computers, laptop computers, or tablet computers; household appliances, such as microwaves, refrigerators, washer and dryers, televisions, or telephone; sports equipments; or tools and protection equipments.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Testing procedures:

Cross (x) Cutting of a Coating Panel: The test is done by using a sharp razor blade to cut two cuts into the coating and down to the substrate with a 30-45 degree angle which intersects to form an "X". Tape is then placed on the center of the intersection of the cuts and then removed rapidly. The X-cut area is then inspected for removal of coating from the substrate and rated in a scale of 0-5 where a rating of 5A means no coating is removed at the X-cut area.

Tape Cross Hatch Adhesion Test: Based on ASTM D3359-Method B. Test results are shown in a rating 0-5 where 0 shows a complete failure of the coating adhesion and 5 shows no loss of adhesion. Minimum acceptable adhesion rating is 3. The cross hatch test uses a cross-hatch pattern rather than the X pattern. A device described in U.S. Patent Publication No. 2006/0042724, published on Mar. 2, 2006, filed on Jun. 16, 2005 with an application Ser. No. 11/154,487, herein incorporated by reference, can be used to create properly spaced and parallel incisions into the coating. Tape is then applied to the incision area and pulled off. The incision area is inspected and rated similarly to the X-cut tape test.

Humidity Test: evaluation of humidity adhesion for 96 hrs, 250 hrs, 500 hrs, and 1000 hrs. Test method based on ASTM D2247, D3359, D1654, D714.

Polyester Resin 1

A polyester resin solution was prepared by charging the following ingredients into a polymerization vessel with a mechanical stirrer, an electric heating mantle, a nitrogen inlet tube, a water separator, a thermometer, an addition funnel and a water cooled reflex condenser. The ingredients are shown in Table 1.

TABLE 1

|  | Parts by Weight |
|---|---|
| Portion 1: | |
| Neopentyl glycol | 200.18 |
| 1,6-Hexanediol | 53.96 |
| Trimethylpropane | 115.29 |
| Isophthalic acid | 94.58 |
| Azelaic acid | 294.63 |
| Phthalic anhydride | 63.64 |
| Portion 2: | |
| Xylene | 62.12 |
| Portion 3: | |
| Toluene | 14.57 |
| Xylene | 11.70 |
| Portion 4: | |
| Methyl ethyl ketone | 76.98 |
| Total | 987.65 |

Portion 1 was charged into the polymerization vessel and with stirring, heated to 125° C. to 150° C. for about 1 hour. Portion 2 was then added and water was distilled off at a temperature of about 220-225° C. Portion 3 was then added. And then Portion 4 was added. The reaction mix was then cooled down to room temperature. The resulting polyester solution had a solid content of about 80%, a hydroxyl number of about 120-150, a number average molecular weight of about 1,200 and a molar ratio of branched polyester/orthophthalic anhydride/linear polyester of 1/1/1.

Polyester Resin 2

A second polyester polyol resin solution was prepared by charging the following ingredients into a polymerization vessel equipped as described for the polyester resin 1. Ingredients are shown in Table 2.

TABLE 2

|  | Parts by Weight |
|---|---|
| Portion 1: | |
| Neopentyl glycol | 333.81 |
| Trimethylpropane | 79.95 |
| Ammonium hydroxide | 58.25 |
| 1,4-Cyclohexane dicarboxylic acid | 205.70 |
| Isophthalic acid | 176.40 |
| Monobutyl Tin oxide catalyst | 0.6 |
| Portion 2: | |
| Methyl isobutyl ketone | 174.77 |
| Total | 1029.48 |

Portion 1 was charged into the polymerization vessel and heated to 200° C. over 3 hours with stirring until to acid number of 10-15 and kettle solids equal to 100%. Portion 2 was then added and the reaction mix was cooled to room temperature. The resulting polyester solution had a solid content of about 80%, hydroxyl number of 160-185, and a number average molecular weight of about 2,100.

Conductive Pigment Dispersion 1

The ingredients in Table 3 were mixed for about 1 hour at high speed by using DBI mixing equipment and then was charged into a 30 gallon sand mill having 0.8 mm glass media and ground by 1 pass at 90 gallon/hour.

TABLE 3

|  | Parts by Weight |
|---|---|
| Polyester resin 1 | 34.50 |
| Methyl n-amyl ketone | 46.52 |
| Diethylene glycol monobutyl ether (Butyl Carbitol[1]) | 13.80 |
| Carbon Black conductive pigment Vulcan XC-72-R[2] | 5.18 |
| Total | 100.00 |

[1]Butyl Carbitol is available from Dow Chemicals USA, Piscataway, New Jersey, USA.
[2]Vulcan XC-72 is available from Cabot Corp., Billerica, Massachusetts, USA.

Conductive Pigment Dispersion 2

The ingredients in Table 4 were charged into a Dual Blade Impeller (DBI) mixing equipment and ground by mixing for 3 hours.

TABLE 4

|  | Parts by Weight |
|---|---|
| Polyester resin 1 | 5.81 |
| Polyester resin 2 | 15.83 |
| Melamine resin 1 (Cymel ® 1158) | 4.51 |
| Melamine resin 2 (Cymel ® 325) | 2.64 |
| Melamine resin 3 (Cymel ® 380) | 4.06 |
| Methyl n-amyl ketone | 14.40 |
| 2-Ethyl hexyl acetate | 3.16 |
| Aromatic 150[1] | 3.16 |
| Acetone | 19.67 |
| Conductive graphite[2] | 26.76 |
| Total | 100.00 |

[1]Available from ExxonMobile as Aromatic 150, Houston, Texas, USA.
[2]Synthetic graphite grade 7782-42-5-4934, available from Asbury Graphite Mills, Inc., Asbury, New Jersey, USA.

Conductive Pigment Dispersion 5

The ingredients in Table 5 were charged into a DBI mixing equipment and ground for 3 hours.

TABLE 5

|  | Parts by Weight |
|---|---|
| Polyester resin 1 (Prepared above) | 16.80 |
| Polyester resin 2 (Prepared above) | 15.81 |
| 2-Ethyl hexyl acetate | 3.06 |
| Methyl n-amyl ketone | 17.29 |
| Acetone | 17.49 |
| Aromatic 150 | 4.15 |
| Conductive graphite[1] | 25.40 |
| Total | 100.00 |

[1]Synthetic graphite grade 7782-42-5-4934, available from Asbury Graphite Mills, Inc., Asbury, New Jersey, USA.

Coating Composition 1

A primer composition is prepared according to the following formulation in Table 6.

TABLE 6

| | Parts by Weight in Gram |
|---|---|
| Part A: | |
| Melamine resin 1 (Cymel ® 1158) | 1.76 |
| Melamine resin 2 (Cymel ® 325) | 1.03 |
| Melamine resin 3 (Cymel ® 380) | 1.50 |
| Polyester resin 1 | 6.93 |
| Conductive pigment dispersion 1 | 14.32 |
| Conductive pigment dispersion 2 | 55.67 |
| Shading pigment dispersion PT101 white[1] | 5.15 |
| Shading pigment dispersion PT140 Yellow[2] | 4.04 |
| The above materials are pre-blend and then combined with the following ingredients: | |
| 2-Ethyl hexyl acetate | 0.60 |
| Acetone | 7.39 |
| Hindered amine light stabilizer Tinuvin ® 123[3] | 0.12 |
| Dibutyl tin diacetate Fascat ® 4200[4] | 0.59 |
| Dinonylnaphthalene disulfonic acid, neutilized with amine (Nacure 3525[5]) | 0.90 |
| Part B: | |
| Desmodur ® XP-7124E[6] | 9.75 |
| Butyl acetate | 0.90 |
| Ethyl acetate | 1.79 |
| 2-Ethyl hexyl acetate | 0.56 |

[1]Available from DuPont, Wilmington, Delaware, USA.
[2]Available from DuPont, Wilmington, Delaware, USA.
[3]Available from Ciba Specialty Chemicals, Tarrytown, New York, USA.
[4]Fascat ® 4200 is available from Arkema, Bristol, Pennsylvania USA.
[5]Nacure 3525 is available from King Industries, Norwalk, Connecticut, USA.
[6]Desmodur ® XP-7124E is available from Bayer Material Science, Pittsburg, Pennsylvania, USA.

The primer composition is activated by adding 8 parts of Part A to 1 parts of Part B by volume. The resulted primer has a solid content of 52.44%, and VOC (less exempt solvent) equal to 3.430 pounds per gallon (0.505 kilograms per liter).

Comparative Coating Composition

A comparative primer composition is prepared according to the following formulation in Table 7.

TABLE 7

| | Parts by Weight in Gram |
|---|---|
| Part A: | |
| Polyester resin 1 | 3.70 |
| Conductive pigment dispersion 1 | 12.48 |
| Conductive pigment dispersion 5 | 69.13 |
| Shading pigment dispersion PT101 white | 13.65 |
| Shading pigment dispersion PT140 Yellow | 0.22 |
| The above materials are pre-blend and then combined with the following ingredients: | |
| 2-Ethyl hexyl acetate | 0.26 |
| 10% solution in Xylene of Bis-(1,2,2,6,6-pentamethyl-4-piperidinyl) sebacate, available as Tinuvin ® 292 UV screener[1] | 0.17 |
| Dibutyl tin diacetate solution Fascat ® 4200 | 0.39 |
| Part B: | |
| Desmodur ® XP-7124E | 9.75 |
| Butyl acetate | 0.90 |
| Ethyl acetate | 1.79 |
| 2-Ethyl hexyl acetate | 0.56 |

[1]Available from Ciba Specialty Chemicals, Tarrytown, New York, USA.

The comparative primer is activated by adding 4 parts of Part A to 1 part of Part B by volume. The resulted comparative primer has a solid content of 58.08%, and VOC equal to 3.413 pounds per gallon (0.503 kilograms per liter).

Adhesion Test and Result

GTX plastic panels were from Standard Plaque Inc., Melvindale, Mich., USA. The panels were clean wiped with solvent such as isopropanol or a mixture of solvents. The pot mix of the coating composition 1 was spray coated on to a set of the GTX plastic panels with a film build of 5-75 micrometers. The coating was cure at room temp for 10-120 min. It can also be Baked at 120-200° F. for up to 30 minutes. A separate set of GTX panels were coated with the comparative coating composition with the same procedure. After curing, the coated panels were aged at room temperature for about 7 days before testing.

The panels were then scribed and tested using the method described in ASTM D3359. The X-cut tape test was done by using a sharp razor blade to cut two cuts into the coating and down to the substrate with a 30-45 degree angle which intersects to form an "X". The panels were then exposed to humidity. At desired time points, tape was placed on the center of the intersection of the cuts and then removed rapidly. The X-cut area was then inspected for removal of coating from the substrate and rated in a scale of 0-5 where a rating of 5A means no coating is removed at the X-cut area.

The cross hatch tape test uses a cross-hatch pattern rather than the X pattern. A device in aforementioned U.S. Patent Publication No. 2006/0042724 was used to create properly spaced and parallel incisions into the coating. After exposure to humidity, the tape was applied and pulled off, and the incision area was inspected and rated similarly to the X-cut tape test.

Table 8 shows adhesion test results of the coating formed by the coating composition 1. Table 9 shows adhesion results of the coating formed by the comparative coating composition.

TABLE 8

Adhesion Test Results for the Coating Composition 1.

| Humidity Exposure Time | X Cross Adhesion | Cross Hatch Adhesion (Grid) |
|---|---|---|
| 0 hours | 5A | 5B |
| 96 hours | 5A | 5B |
| 250 hours | 5A | 5B |
| 500 hours | 5A | 5B |
| 1000 hours | 5A | 5B |

TABLE 9

Adhesion Test Results for the Comparative Coating Composition.

| Humidity Exposure Time | X Cross Adhesion | Cross Hatch Adhesion (Grid) |
|---|---|---|
| 0 hours | 5A | 1B |
| 96 hours | 5A | 0B-1B |
| 250 hours | 5A | 2B-4B |
| 500 hours | 5A | 0B-4B |
| 1000 hours | 5A | 0B-4B |

As shown in Table 8, the coatings formed by the coating composition 1 had excellent adhesion: adhesion ratings at all conditions tested were equal to or greater than 5B. In contrast, coatings formed by the comparative coating composition without melamines had poor and variable adhesion from panel to panel. Among the panels tested, adhesion ratings of the panels were ranging from 0B (poor) to 4B (moderate) (Table 9).

What is claimed is:

1. A coating composition curable at ambient temperatures, said coating composition consisting of:
   (A) a crosslinkable component consisting of 15 to 99 weight percent of total solid weight of the crosslinkable component a polyester having hydroxyl crosslinkable groups and a weight average molecular weight in a range of from 1500 to 100,000, and 1 to 15 weight percent of total solid weight of the crosslinkable component a melamine having crosslinkable groups selected from an —NH group, a hydroxyl group, or a combination thereof;
   (B) a crosslinking component consisting of a polyisocyanate compound having two or more isocyanate groups that react with the crosslinkable groups at ambient temperatures in a range of from 40° F. (4° C.) to 200° F. (93° C.);
   (C) one or more pigments or effect pigments; and
   (D) one or more additives selected from conductive additives, viscosity adjuster, catalyst, one or more solvents, or a combination thereof;
   wherein said coating composition is formulated as a primer, or a color matched primer.

2. The coating composition of claim 1, wherein the polyisocyanate compound is a diisocyanate, a diisocyanate trimer, a triisocyanate, a triisocyanate trimer, or a combination thereof.

3. The coating composition of claim 1, wherein the melamine is selected from monomeric melamine, alkylated melamine, polymeric melamine-formaldehyde resin, alkylated polymeric melamine-formaldehyde resin, or a combination thereof.

4. A coated plastic substrate coated with the coating composition of claim 1.

5. A coating composition curable at ambient temperatures, said coating composition consisting of:
   (A) a crosslinkable component consisting of 15 to 99 weight percent of total solid weight of the crosslinkable component a polyester having hydroxyl crosslinkable groups and a weight average molecular weight in a range of from 1500 to 100,000, and 1 to 15 weight percent of total solid weight of the crosslinkable component a melamine having crosslinkable groups selected from an —NH group, a hydroxyl group, or a combination thereof;
   (B) a crosslinking component consisting of a polyisocyanate compound having two or more isocyanate groups that react with the crosslinkable groups at ambient temperatures in a range of from 40° F. (4° C.) to 200° F. (93° C.);
   (C) one or more pigments or effect pigments;
   (D) one or more additives selected from conductive additives, viscosity adjuster, catalyst, one or more solvents, or a combination thereof; and
   (E) acrylic polymers, reactive oligomers, or a combination thereof.

* * * * *